United States Patent [19]
Prati et al.

[11] Patent Number: 5,332,999
[45] Date of Patent: Jul. 26, 1994

[54] PROCESS FOR GENERATING SYNTHETIC APERTURE RADAR INTERFEROGRAMS

[75] Inventors: Claudio Prati; Fabio Rocca, both of Milan, Italy

[73] Assignee: Agence Spatiale Europeenne, Paris, France

[21] Appl. No.: 14,240

[22] Filed: Feb. 5, 1993

[51] Int. Cl.⁵ .............................................. G01S 13/90
[52] U.S. Cl. ........................................................ 342/25
[58] Field of Search ........................................... 342/25

[56] References Cited

U.S. PATENT DOCUMENTS

| | | | |
|---|---|---|---|
| 3,603,992 | 9/1971 | Goggins et al. | 342/25 |
| 4,602,257 | 7/1986 | Grisham | 342/25 |
| 4,727,373 | 2/1988 | Hoover | 342/25 |
| 4,794,395 | 12/1988 | Cindrich et al. | 342/25 |
| 4,975,704 | 12/1990 | Gabriel et al. | 342/25 |
| 5,051,749 | 9/1991 | Stoyle | 342/25 |

OTHER PUBLICATIONS

Range Resolution Enhandement With Multiple Sar Surveys Combination, C. Prati and F. Rocca, Proceedings of IGARSS'92 Houston May 1992, pp. 1576–1578.

*Primary Examiner*—T. H. Tubbesing
*Attorney, Agent, or Firm*—Sughrue, Mion, Zinn, Macpeak & Seas

[57] ABSTRACT

A process for generating synthetic aperture radar interferograms comprises the following steps. First and a second radar images of a scene from a first and a second position spaced apart by a given baseline are generated. A first signal of said first image within a first radio frequency band of the spectrum is recorded. A second signal of said second image within a second radio frequency band of the spectrum having a frequency shift relatively to the first detecting band is recorded. The frequency shift being such that it ensures or maximizes correlation between the first and the second images. The first and second signals are combined for generating an interferogram of said scene.

6 Claims, 4 Drawing Sheets

PROCESS FOR GENERATING SYNTHETIC APERTURE RADAR INTERFEROGRAMS

FIELD OF THE INVENTION

The invention relates to a process for synthetic aperture radar interferometry for generating SAR interferograms.

BACKGROUND OF THE INVENTION

SAR interferometry allows the derivation of phase fringes that can be related, for example, to the terrain topography, by exploiting the phases of focused images which are gathered in multiple satellite passes or in a single pass of a platform with two antennas (i.e. airborne interferometry).

Strip-mapping Synthetic Aperture Radar (SAR) is a microwave imaging system for generating high resolution terrain images from echoes collected by a relatively small antenna. Along-track (azimuth) resolution is achieved by combining many radar returns so that a large antenna is simulated. Across-track (slant range) resolution is achieved through time-delay measurements using time-dispersed linearly frequency modulated pulses that can be compressed into extremely short pulses. The practical limit to the azimuth resolution of present-day spaceborne SAR systems (i.e., SEASAT, ERS-1 JERS-1) is about 20-30 meters. This limitation exists principally in order to obtain a reasonable swath width and to avoid a huge amount of data to be transmitted to earth stations. Nonetheless, areas of interest can be easily imaged with higher azimuth resolution (1-2 meters) using the spot-light SAR technique, as disclosed by D.C. MUNSON Jr. et al. ("A Tomographic Formulation of Spot light August 1983 and by C. PRATI et al. ("Spot Mode SAR focusing with the $\omega$-k Technique") in Proceedings of IGARSS'91 HELSINKI, June 1991.

On the other hand, the across-track resolution is practically limited to 7-8 meters (i.e. the transmitted signal bandwidth is limited to about 20 MHz) by power constraints.

A need has arisen for a SAR system having an increased across-track resolution of objects, for which two focused images are measured in the two receiving antennas separated slightly in the across-track direction or with only one antenna on two separate passes, this involving imaging on two separate orbits.

It has been shown by many authors that the largest baseline (i.e. the distance between the two takes in the across-track direction) that allows interferogram generation is limited by the ground range resolution, (i.e. the range bandwidth must exceed Nyquist rate for the interferometer fringes so that the speckle noise in the pixels being compared does not decorrelate).

SUMMARY OF THE INVENTION

The basic idea of the present invention is that a variation $\Delta\theta$ of the off-nadir angle can be regarded as an equivalent radio frequency shift $\Omega$, this being a key point to enhance across-track resolution.

According to the teaching of the invention, there is provided a process for generating wider band synthetic aperture radar interferograms comprising the steps of:
generating a first and a second radar image of a scene from a first and a second position spaced apart by a given baseline,
recording a first signal of said first image within a first radio frequency band of the spectrum,
recording a second signal of said second image within a second radio frequency band of the spectrum having a frequency shift relative to said first detecting band, said frequency shift being such that it ensures or maximizes correlation between the first and the second image,
combining said first and second signals for generating an interferogram of said scene.

The frequency shift allows an increase in the across-track resolution. In turn better altitude resolution will be provided by larger baselines made possible by the said increased across-track resolution. The invention also provides a process wherein said first and second radar images are generated on two separate passes by a first and a second satellite on two separate orbits and wherein at least one of said satellites has tunable reception means whereby said frequency shift may be produced. The frequency shift may be $$\Omega = \frac{\omega_0 \Delta\theta}{\tan\theta}$$

$\omega_0 = 2\pi f_0$, being the central frequency of an image generator.
$\theta$ = mean value of the off-nadir angles of the first and second positions.
$\Delta\theta$ = difference between the off-nadir angles of the first and second positions.

This frequency shift provided by the invention compensates the effects of the off-nadir angle changes and restores the otherwise compromised image correlation.

According to a preferred embodiment, the combination step also comprises a phase shift of the second signal relatively to the first signal. This phase shift may be a constant term which maximizes the absolute value of the image. The phase shift may be, for each point $Y_o$ of the scene $$\phi = \frac{2\omega_0}{c}(z_{02} - z_{01}) + \Omega\tau$$

DETAILED DESCRIPTION OF A PREFERRED EMBODIMENT

Figure 1:
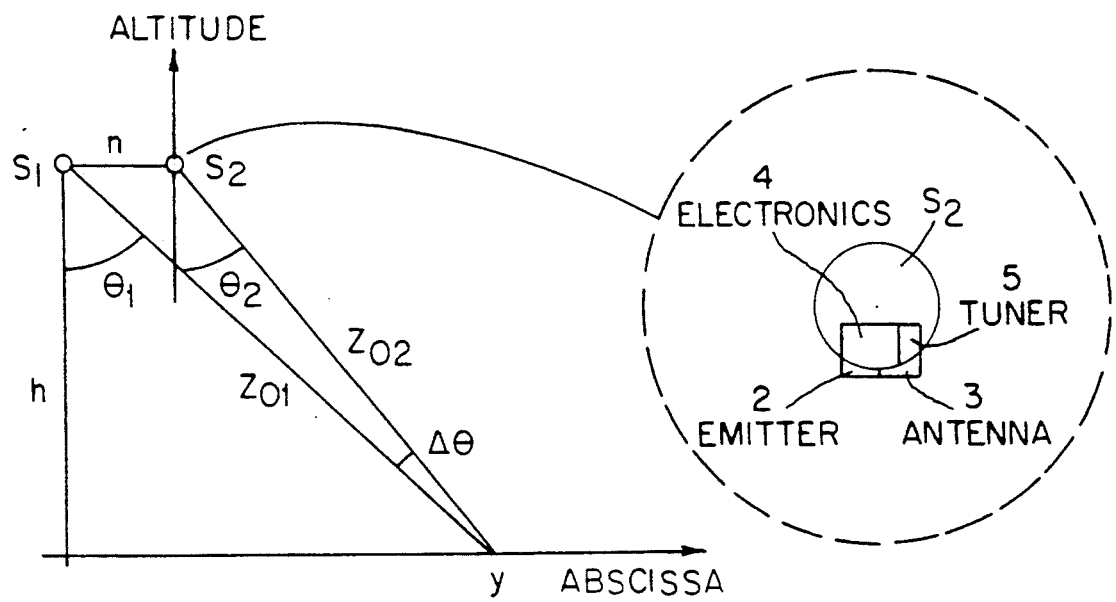
FIG. 1 illustrates the multiple SAR survey geometry according to the invention as well as a satellite to perform such a survey.

As shown in FIG. 1 a multiple survey (in two passes for example) is performed preferably at the same altitude by two satellites $S_1$ and $S_2$ having orbits such that, viewed from the ground, they are separated by a baseline n. The off-nadir angle of satellite $S_1$ is $\theta_1$ relative to a given point on the ground having an abscissa y, and the distance between satellite $S_1$ and point y is $Z_{01}$. For satellite $S_2$, off-nadir angle is $\theta_2$ and distance to point y is $Z_{02}$.

Satellites $S_1$ and $S_2$ have emitting devices 2, a receiving array of antennas 3 and a conventional electronic system 4 to monitor emission and reception of the radar signals, incorporating a tuner 5. For at least one of the satellites, tuner 5 has a tunable detecting band, for example, incorporating a phase-locked loop and a frequency generator as is known.

The wide synthetic azimuth antenna and the extremely short pulses transmitted by the physical SAR antenna identify small areas on the terrain: the azimuth-range resolution cell. For the sake of simplicity, the terrain is assumed to be flat and the resolution cell rectangular. We shall focus our attention on how the ground range dimension of the resolution cell is achieved. Then, it will be shown that the difference $\Delta\theta$ between the off-nadir angles $\theta_1$ and $\theta_2$ can be regarded as an equivalent frequency shift $\Omega$ (the key point for across-track resolution enhancing).

Each scatterer on the terrain can be regarded as a source at abscissa y that expands at time $t=0$, characterized by a phase and an amplitude r(y). The terrain reflectivity r(y) is supposed to be a complex, zero mean, gaussian and white spectrum signal. The scatterers generate an electromagnetic field that propagates in all directions. Referring to the geometry of FIG. 1, the signal measured by a spaceborne antenna in position (h,y=0) is:

$$S(t) = \int_{V_{min}}^{V_{max}} r(y) \delta\left(t - \frac{2}{c}\sqrt{h^2 + y^2}\right) dy \tag{1}$$

where c is the speed of light and factor 2 accounts for the two-way radiation path.

Since the integral is different from zero only for:

$$y = \sqrt{\frac{c^2 t^2}{4} - h^2} \tag{2}$$

the following expression of the measured signal holds:

$$S(t) = Ar\left(\sqrt{\frac{c^2 t^2}{4} - h^2}\right) \tag{3}$$

where A is a scale factor that depends on the off-nadir angle $\theta$ (remember that we are dealing with flat terrain) as:

$$A = \frac{c}{2} \sqrt{\frac{h^2 + y^2}{y}} \tag{4}$$

(For the sake of simplicity A will be neglected in the following).

Thus, as expected, the achievable across-track resolution is infinite since the transmitted signal has an infinite frequency bandwidth. However, real systems have a finite resolution due to a limited frequency band of the transmitter and receiver units. The frequency band limitation takes the form of a convolution in time with a band-pass filter. The following expression of the band-pass filter impulse response will be adopted:

$$h_{BP}(t) = w(t)e^{j\omega_0 t} \tag{5}$$

where w(t) is a window in time (i.e. a low pass impulse response) and $\omega_0/2\pi$ is the central frequency of the transmitter and receiver.

Thus, $$S(t) = r\left(\sqrt{\frac{c^2 t^2}{4} - h^2}\right) * w(t)e^{j\omega_0 t} \tag{6}$$

The down converted version of S(t) is $$S_1(t) = r\left(\sqrt{\frac{c^2 t^2}{4} - h^2}\right) e^{-j\omega_0 t} * w(t) \tag{7}$$

The measured signal $S_1(t)$ can also be expressed as a function of the ground range variable y taking advantage of equation (2).

$$S_1(2/C \times \sqrt{h^2 + h^2}) = \tag{8}$$

$$r(y)e(-j2\omega_0/c\sqrt{h^2 + y^2}) * w(2/C \times \sqrt{h^2 + y^2})$$

If we let $$y = y_o + u \tag{9}$$

$$z_{01} = \sqrt{h^2 + y_o^2} \tag{10}$$

$$\sin\theta_1 = \frac{y_o}{z_{01}} \tag{11}$$

we have approximately $$t = \frac{2}{c}(z_{01} + u\sin\theta_1) \tag{12}$$

where $\theta_1$ is the off-nadir angle corresponding to the swath center.

With equation 12, the down converted signal can be approximated as follows:

$$S_1(2u/c \times \sin\theta_1) = r(y_o+u)e^{-j2\omega_0/c(z_{01}+u\sin\theta_1)} \times w(-2\sin\theta_1/c) \tag{13}$$

Thus, the received signal in ground range variables can be interpreted as the convolution between the terrain reflectivity around $y_o$ (phase and frequency shifted) and window w.

Let us now consider case of multiple surveys. A signal $S_2(t)$ is measured by a second spaceborne antenna in position (h,y=−d). Similarly, with $$z_{02} = \sqrt{h^2 + (y_o + d)^2}$$

and $$\sin\theta_2 = \frac{(y_o + d)}{\sqrt{(h^2 + (y_o + d)^2)}}$$

we obtain:

$$S_2(2u/c \times \sin\theta_2) = \quad (14)$$

$$r(y_o + u) e^{-j2\omega o/c(zo2 + u\sin\theta_2)} * w(2u/c \times \sin\theta_2)$$

Notice that the first received signal (equation 13) is stretched with respect to the second one (equation 14). The largest slant range relative shift occurs at the edges of the considered range swath (u):

$$\frac{c}{2}\Delta t = u(\sin\theta_2 - \sin\theta_1) \approx u\,\Delta\theta\cos\theta \quad (15)$$

where $$\Delta\theta = \theta_2 - \theta_1$$

and $$\theta = \frac{\theta_1 + \theta_2}{2} \approx \theta_1 \approx \theta_2$$

However, since $\Delta\theta$ is small as well as the considered range swath, any relative signal and window stretching can be neglected. As an example, for SEASAT and ERS-1 geometries, if d=5 km (i.e. a distance that allows a 100% slant range resolution enhancement for SEASAT and, by combining more than two surveys, 500% for ERS-1, as will be shown in the following) and $u=\pm 15$ m (the smallest range swath, corresponding to a ground range resolution cell), the largest shift is:

$$\frac{c}{2}\Delta t = 5 \cdot 10^{-3} \cdot 15 = 7.5 \text{ cm}$$

that can be neglected if compared with the slant range resolution cell (approximately 7 meters).

Thus, with $$\tau = u\frac{2}{c}\sin\theta = u\gamma \quad (16)$$

the following expressions are:

$$S_1(2u/c \times \sin\theta_1) \approx S_1(\tau) = r(y_o + \tau/\gamma)e^{-j2\omega o/c(z01 + \tau\sin\theta_1/\gamma)} \times w(\tau) \quad (17)$$

$$S_2(2u/c \times \sin\theta_2) \approx S_2(\tau) = r(y_o + \tau/\gamma)e^{-j2\omega o/c(z02 + \tau\sin\theta_2/\gamma)} \times w(\tau) \quad (18)$$

Let us call $R(\omega)$ the Fourier transform of the terrain reflectivity $r(y_o + \tau/\gamma)$ and of the window $w(\tau)$ respectively. By Fourier transforming equations 17 and 18 we obtain the following:

$$S_1(\omega) = R(\omega + \omega_o\sin\theta_1/\sin\theta)e^{-j2\omega o/c\,z01}W(\omega) \quad (19)$$

$$S_2(\omega) = R(\omega + \omega_o\sin\theta_2/\sin\theta)e^{-j2\omega o/c\,z02}W(\omega) \quad (20)$$

Figure 2:
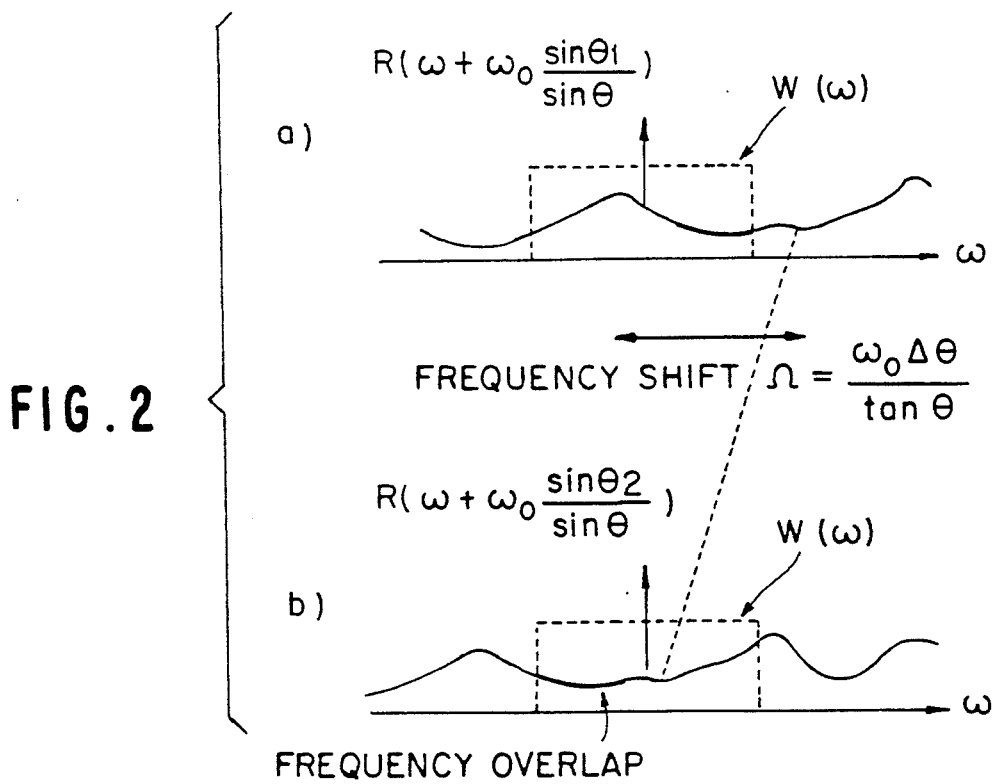
FIG. 2 illustrates the relative spectral shift of ground reflectivities of a scene observed from a first (a)) and a second (b)) off-nadir angle.

While $R(\omega)$ extends from 0 to infinite frequency, in principle, $W(\omega)$ corresponds to the onboard bandlimiting filter. Thus, it can be seen that spectra of the received signals approximately represent different bands of the reflectivity spectrum, as shown for example in FIG. 2. The band position can be selected by choosing the appropriate off-nadir angle $\theta_i$. The relative frequency shift is $$\Omega = \frac{\omega_o\Delta\theta}{\tan\theta} \quad (21)$$

It is now clear that across-track resolution can be improved by recovering a larger band of the reflectivity's spectrum; this is done by shifting in frequency and in phase one signal with respect to the other and then adding the two.

What is basic for the usefulness of this technique is that the exact relative frequency shift can be derived from $S_1(\tau)$ and $S_2(\tau)$ if their spectra partially overlap.

In this case the phase difference between the overlapping parts of the two signals can be estimated by means of the scene cross-correlation used in interferometric SAR techniques.

It can be shown (see appendix A) that the expected value of the interferometric signal obtained by multiplying $S_1(\tau)$ times the complex conjugate $sX_2(\tau)$ of $S_2(\tau)$ is:

$$E\{S_1(\tau)\cdot S\times_2(\tau)\} = P(\Omega)\cdot exp(j\phi) \quad (22)$$

where $$\phi = \frac{2\omega_o}{c}(z_{O2} - z_{O1}) + \Omega\tau \quad (23)$$

and $P(\Omega)$ is proportional through the term $\sigma^2 o/\gamma$ ($\sigma_o$ is the backscattering coefficient) to the Fourier transform of $w^2(t)$ evaluated at $\Omega$.

Comparing equations 23, 17 and 18, we can note that the phase term $\phi$ is an estimation of the reflectivity spectrum shift and phase rotation due to a change of the off-nadir angle. How good the estimation is depends on the amplitude $P(\Omega)$ of the interferometric signal compared with the system noise.

The Fourier transform of $w^2(t)$ is a decreasing function of frequency (for the sake of simplicity, in the case of oscillating functions, only the main lobe is considered). Thus, in general, the smaller is $\Omega$ the higher is $P(\Omega)$.

As an example, if window $w^2(t)$ is rectangular from $t = -T/2$ to $t = T/2$, $$P(\Omega) = \frac{2\sigma_o^2}{\gamma}\frac{\sin(\Omega T/2)}{\Omega} \quad (24)$$

Thus, as a first approximation, $P(\Omega)$ is meaningful for:

$$|\Omega| \leq \frac{2\pi}{T} \quad (25)$$

that is for $$|\Delta\theta| \leq \frac{2\pi}{\omega_o T}\tan\theta = \frac{f_b}{f_o}\tan\theta \quad (26)$$

where $f_b$ is the receiving system bandwidth and $f_o$ is the radar frequency in Hertz. The largest allowed $\Delta\theta$ can also be expressed as a function of the transmitted wavelength $\lambda$ and the slant range resolution $\rho$ as:

$$|\Delta\theta| = \frac{\lambda}{2\rho}\tan\theta \quad (27)$$

If we refer again to the geometry of FIG. 1 it can be found that distance d between the two antennas must be smaller than 5 km for SEASAT and 1 km for ERS-1.

In conclusion, if condition 26 is satisfied, i.e., the spectra of the two reflected signals partially overlap, the phase of the interferometric signal can be used for phase and frequency shifting of the second signal with respect to the first in order to improve slant-range resolution. It is clear that the larger the frequency shift, the greater the resolution improvement; meanwhile, the phase estimation is less robust.

As shown in the previous section, slant range resolution can be improved by combining two surveys of the same area from different off-nadir angles. The improved resolution image $S_3(\tau)$ can be generated as follows:

$$S_3(\tau) = S_1(\tau) + e^{j\phi} S_2(\tau) \tag{28}$$

In appendix B it is shown that the improved resolution image can be usefully expressed by equation (51) there, reproduced here $$S_3(\tau) = S_1(\tau) \cdot (w(\tau) + w(\tau) e^{j\Omega \tau}) \tag{29}$$

Equation (29) states that the image obtained with the multiple surveys combination defined in 28, can be regarded as the image observed from a single antenna with a larger bandwidth. After coherent signals summation (equation 28) the spectrum amplitude of the improved resolution image $S_3(\tau)$ is not flat due to the frequency overlap. An amplitude equalizer must be applied after summation.

Theoretical conclusions derived in the previous sections have been first verified on simulated SAR data using parameters similar to those of the ERS-1 mission. The parameters used in the simulations are reported in table 1.

Figure 3:
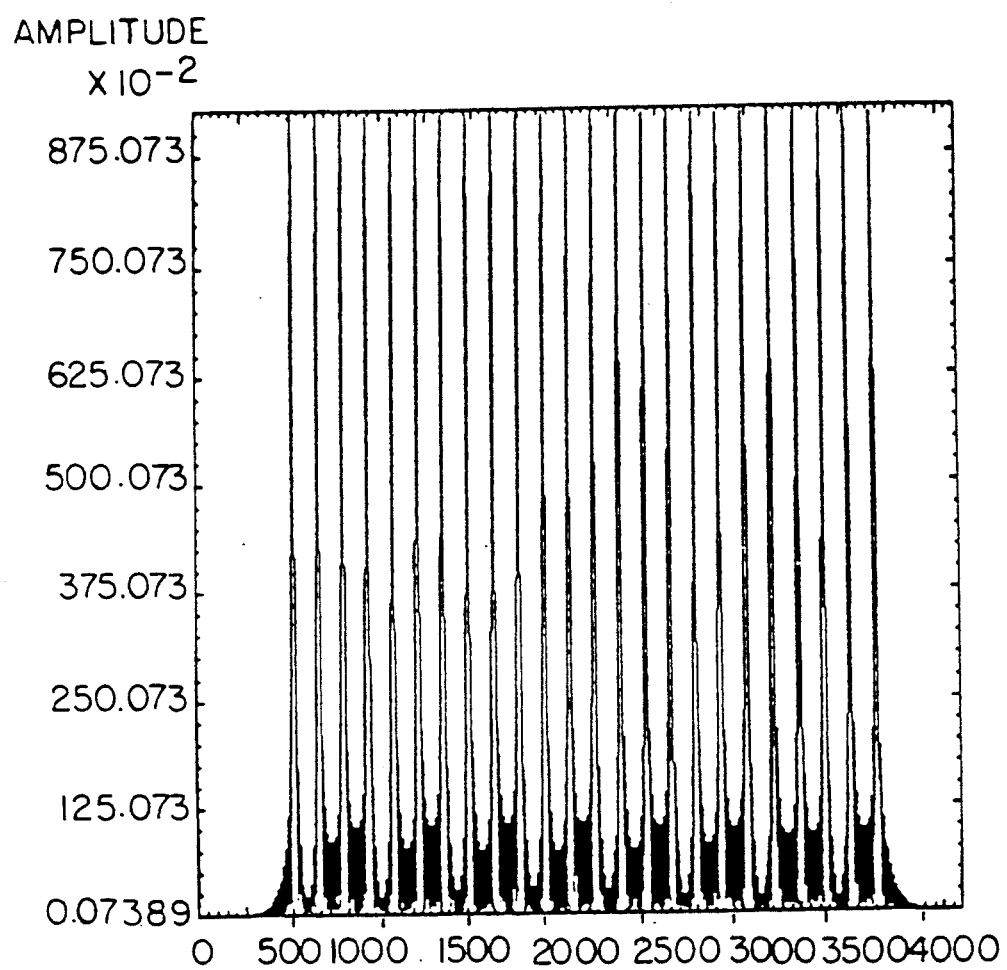
FIG. 3 illustrates the synthetic data obtained by a ERS-1 satellite for a single survey (simulated data of the range line of a focused corner reflector array).

According to this simulation, an array of 24 uniformly spaced (350 meters) corner reflectors has been "placed" along a ground range line. Two raw data sets of this simulated scene have been generated using different parallel orbits. FIG. 3 shows one range line of the focused data. Complex full resolution images have been first oversampled by a factor of 4 and precisely registered. Then, the improved resolution image has been formed following equation 28. The phase term $\phi$ has been computed taking advantage of the exact knowledge of the system geometry, for the frequency shift of 0.267. $f_s$ (where $f_s$ is the single survey sampling frequency).

Figure 4:
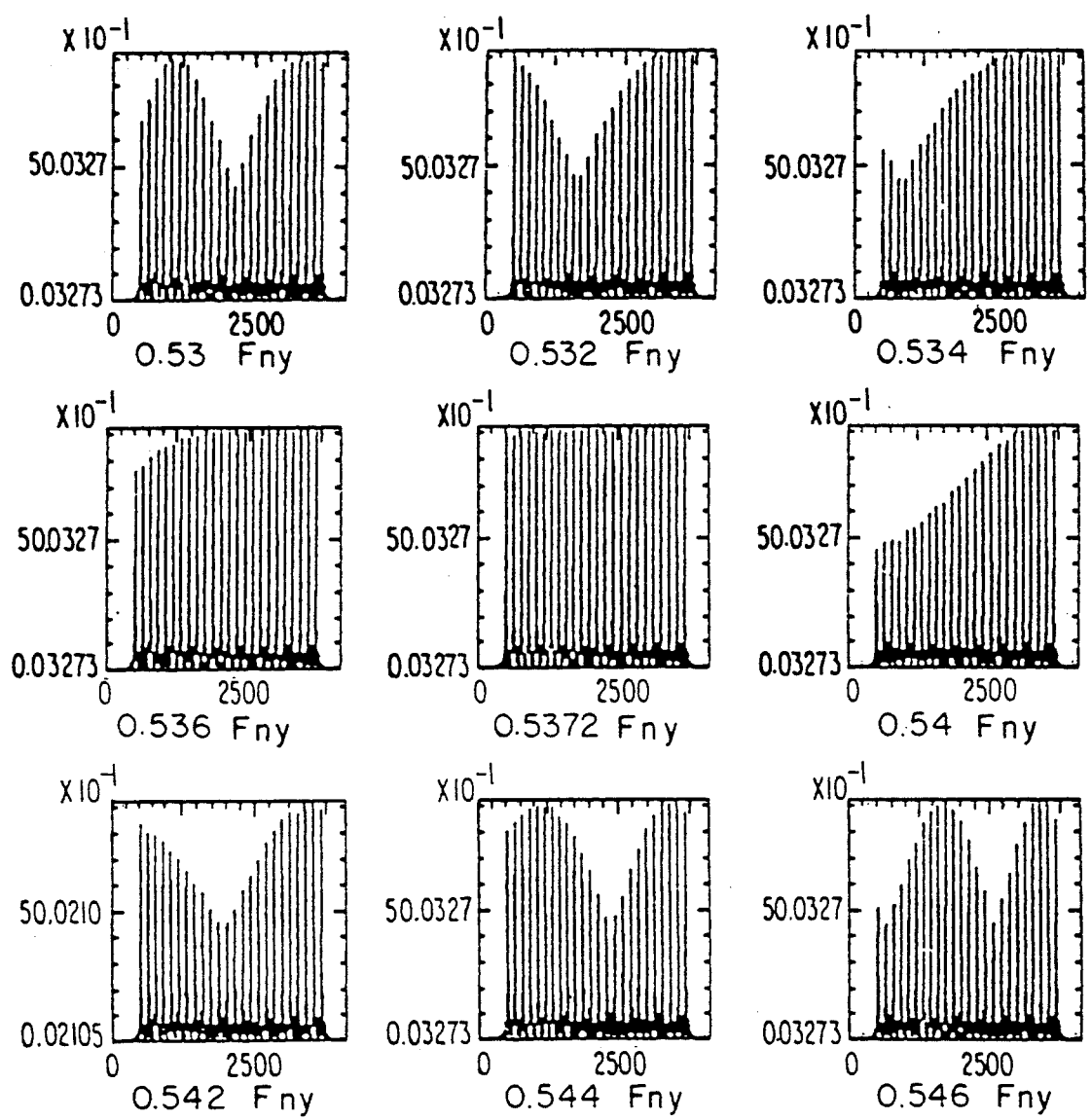
FIG. 4 illustrates the result of simulations obtained with different relative frequency shifts expressed as a fraction of the Nyquist frequency $F_{Ny}$ (simulated data of the range line of a focused corner reflector array).
Figure 5:
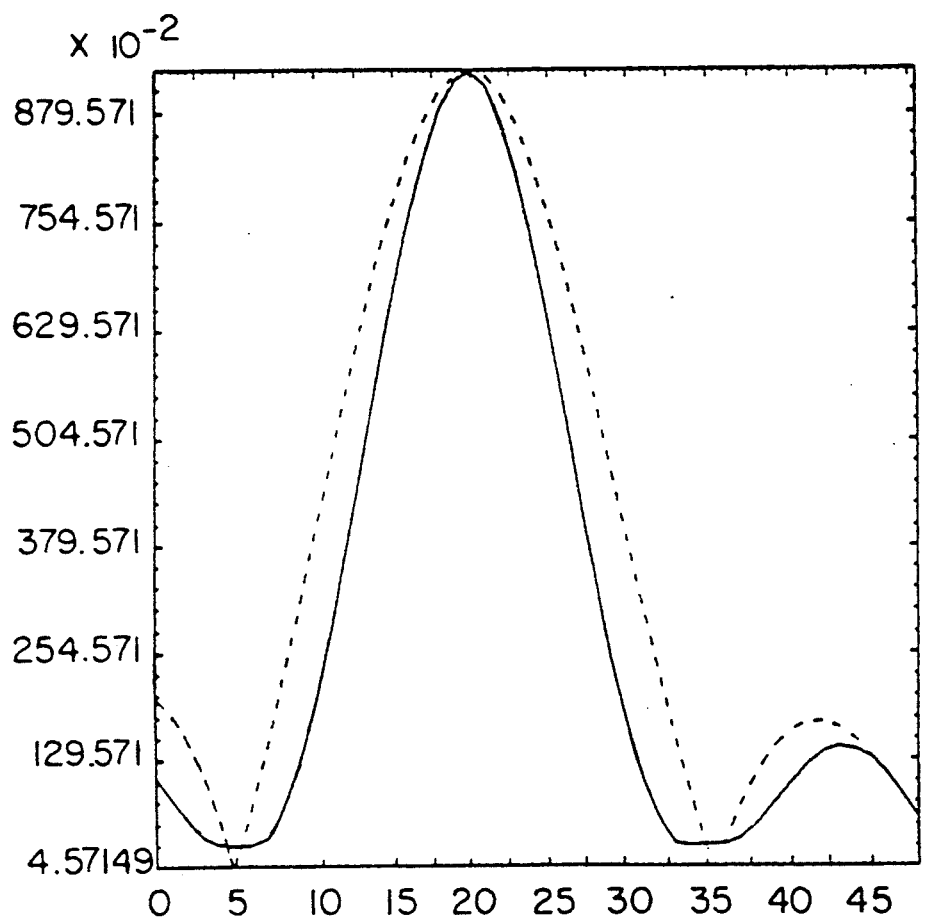
FIG. 5 illustrates the result of a magnified simulation of one corner reflector of the array before (a) and after (b) multiple survey combinations with vertical orbit distance of 1 km, a fringe frequency of 0.5372 $F_{Ny}$ and an interpolation factor of 8.

However, since in practice the phase term $\phi$ must be estimated from interferometry with a small unavoidable error, a simple iterative method to get the best result has been developed. As shown in equation 23, phase $\phi$ has a constant and a linearly range varying term. A first set of improved resolution images are generated with the same constant phase term and slightly different range varying terms. FIG. 4 shows the results obtained. It is clear that incorrect values would generate sinusoidal oscillations of the moduli along range. Thus, the correct value will be the one that minimizes such oscillations. Finally, the correct constant phase term is identified as the one that maximizes the absolute value of the image (more precisely, we look for the phase value that minimizes the absolute values; then we add $\pi$). Range resolution is thus improved, as shown in FIG. 5. Notice that the resolution improvement is proportional to the ratio between the actual signal bandwidth (not the sampling frequency) and the computed frequency shift (0.267·$f_s$). In this case we have a 50% resolution improvement.

A further test has been performed on the available SEASAT data (see Table 2) of Panamint Valley.

TABLE 1

| Simulation parameters. | |
| --- | --- |
| Central frequency | 5.0 GHz |
| Orbit height | 800 km |
| Look angle (off-nadir) | 20° |
| $\Delta\theta$ | .0211° |
| Equivalent frequency shift $\frac{\Omega}{2\pi}$ | 5.06 MHz |
| Chirp bandwidth ($f_b$) | 12.0 MH |
| Slant range sampling frequency ($f_s$) | 18.96 MHz |

TABLE 2

| SEASAT parameters. | |
| --- | --- |
| Central frequency | 1.27 GHz |
| Orbit height | 800 km |
| Look angle (off-nadir) | 20° |
| $\Delta\theta$ | .0665° |
| Equivalent frequency shift $\frac{\Omega}{2\pi}$ | 4.05 MHz |
| Chirp bandwidth ($f_b$) | 19.0 MHz |
| Slant range sampling frequency ($f_s$) | 22.5 MHz |

Unfortunately, in this case, the shift of the reflectivity spectrum is small (approximately 0.179·$f_s$), and the achievable resolution improvement is relatively small (20%). However, this test shows that the same technique used for simulated data can be adopted also for real cases. A flat area of Panamint Valley (64×64 pixels large) has been chosen. The iterative technique used for the simulated data has been applied.

In this case, however, the absolute value of the single survey is not a constant as for the simulated case. Both images have first been averaged along azimuth. As in the previous case, the value that minimizes oscillations has been identified and selected.

Previous sections deal with a theoretical derivation of slant-range resolution improvement in the case of flat terrain. In this section topographic effects will be analyzed. Let us first consider a straightforward extension to the case of a sloping terrain. It is clear that multiple survey geometry in case of terrain with an uniform slope in range of $\alpha$ radians can be seen as a flat terrain geometry provided that off-nadir angles $\theta_1$ and $\theta_2$ are changed to $\theta_1 - \alpha$ and $\theta_2 - \alpha$ respectively. Previous results can be applied as well. Notice that for slope angles $\alpha$ close to $\theta_1$ and $\theta_2$, the relative spectral shift $\Omega$ (equation 21) is very large. Therefore, $P(\Omega)$ may be close to zero, and relative phase and frequency shift expressed by equation 23 may not be measured.

In almost all practical cases, the ground topography is not uniform. We analyze now the effects. Referring again to the geometry of FIG. 1, and assuming a random terrain altitude q(y) with zero mean, the following expression of the received signal (see equation 8) holds:

$$S_1(2/C \times \sqrt{\{h + q(y)\}^2 + y^2} = r(y) e^{(-j2\omega_0/c}\sqrt{\{h+q(y)\}^2+y^2})^* w(2/X \times \sqrt{\{h+q(y)\}^2+y^2}) \tag{30}$$

-continued

Now we have, proceeding as above $$S_1\left(\frac{2}{c}(u\sin\theta_1 + q(y_o + u)\cos\theta_1)\right) = \tag{31}$$

$$r(y_o + u)\, e^{-j2\omega o/c(zO1 u\sin\theta_1 + q(y_o+u)\cos\theta_1)} *$$

$$w\left(\frac{2}{c}\{u\sin\theta_1 + q(y_o + u)\cos\theta_1\}\right)$$

Note that the term $q(y_o+u)\cos\theta_1$ could be comparable to the slant range resolution cell dimension (a relative elevation of a few meters could be enough to move the imaged point out the resolution cell). However, since we are interested in the combination of two images of the same area observed from slightly different off-nadir angles, only relative arrival time displacement of the same reflector will be considered.

$$\Delta t = \frac{2q(y_o + u)}{c}(\cos\theta_1 - \cos\theta_2) = \frac{2q(y_o + u)}{c}\Delta\theta\sin\theta \tag{32}$$

Thus, the received signal S1(t) can be regarded as the signal that would have been received from a flat terrain with reflectivity:

$$g(u) = r\left(y_o + u - \frac{q(y_o + u)}{\tan\theta_1}\right) \tag{33}$$

As in equation (17), $$S_1(2u/c \times \sin\theta_1) = \tag{34}$$

$$g(u) \cdot e^{-j2\omega o/c(zO1 + u\sin\theta_1 + q(y_o+u)\cos\theta_1)} * w(2u/c \times \sin\theta_1)$$

If we consider signal $S_2(t)$ measured by a second spaceborne antenna from a different off-nadir angle $\theta_2$ we find:

$$S_2(2u/c \times \sin\theta_2) = \tag{35}$$

$$g(u) \cdot e^{-j2wo/c(zo1 + u\sin\theta_2 + q(y_o+u)\cos\theta_2)} * w(2u/c \times \sin\theta_2)$$

where we have taken $$r\left(y_o + u - \frac{q(y_o + u)}{\tan\theta_2}\right) \approx r\left(y_o + u - \frac{q(y_o + u)}{\tan\theta_1}\right) = g(u) \tag{36}$$

Finally, exploiting equation (16), we obtain the following expressions:

$$S_1(\tau) = g(\tau/\gamma) \cdot e^{-j2\omega o/c(zO1 + \tau/\gamma X\sin\theta_1 + q(y_o+\tau/\gamma \cdot)\cos\theta_1)} \times w(\tau) \tag{37}$$

$$S_2(\tau) = g(\tau/\gamma) \cdot e^{-j2\omega o/c(zO2 + \tau/\gamma X\sin\theta_2 + q(y_o+\tau/\gamma \cdot)\cos\theta_2)} \times w(\tau) \tag{38}$$

What is relevant in equations (37) and (38) is that in this case the phase variation is no longer a linear function of the variable $\tau$. In Appendix C, it is shown that the interferometrical term can be correctly estimated if the average altitude of the considered range swath is zero and the average altitude variation within the resolution cell is smaller than a few meters.

Moreover, we shall now show that slant-range resolution can be improved as well, if the altitude changes of the scatterers within the resolution cell is smaller than a few meters (3-4). Let us suppose that the mean terrain altitude within the resolution cell is q. It can be shown that the signals combination obtained through equation 28 has the following expression:

$$S_3(\tau) = S_1(\tau) \times (w(\tau) + w(\tau)e^{j\Omega\tau}e^{-j2\omega o/c\bar{q}\Delta\theta\sin\theta}) \tag{39}$$

(Formula 39 can be derived straightforwardly from equations 37, 38 by using the same computations described in Appendix B).

Comparing equations 29 and 39, we can note that the constant elevation $\bar{q}$ introduces a relative phase error when different spectral bands of the reflectivity are combined.

If we consider SEASAT multiple surveys, with d=5 km (that in principle would allow a 100% resolution improvement) and $\bar{q}=1$ m, we would have a phase error of 4 degrees.

Therefore, we can write:

$$e^{-j2\omega o/c\cdot\bar{q}\cdot\Delta\theta\cdot\sin\theta} \approx 1 - j\Omega\gamma\bar{q}\tan\theta \tag{40}$$

and the composite filter becomes:

$$w(\tau) + w(\tau)e^{j\Omega\tau} - jw(\tau)e^{j\Omega\tau}\cdot\Omega\gamma\bar{q}\tan\theta \tag{41}$$

The result is a quadrature noise component whose main effect is a slight reduction of the amplitude of the wider band image (approximately 0.2% in the previous example).

The technique according to the invention allows an increase in the across-track resolution of objects that do not substantially change with time by using multiple surveys of the same area from different off-nadir angles. Precise information on spaceborne trajectories are not requested since they can be derived from SAR interferometry. Limits to the applicability of this technique have been identified:

i—the distance between two parallel satellite passes must be small enough to allow SAR interferometry (i.e., 5 km for SEASAT, 1 km for ERS-1 and 3 km for JERS-1, as a limit since a spectrum overlap is needed to rephase the signals). In the case of a tunable receiver this limit is overcome.

ii—altitude variations within the ground range resolution cell must be smaller than a few meters (3-4 for practical systems).

In this case, the slant-range resolution could be increased by, let us say, 50% by using two surveys. However, the improvement in slant-range resolution could be quite noticeable if more than two surveys are exploited. Many relatively shifted spectra of the same object can be combined with respective frequency shifts relatively to the signals of a first satellite in order to increase the system bandwidth of, let us say, 3-4 times. As a possibility ERS-1 data collected from at least 12 orbits distant 200 meters (approximately) should be combined for a 5 m×5 m ground resolution for those objects that did not change during observation time. In order to avoid excessive time decorrelation, the orbits should be as close in time as possible.

It can be noted that this method is not limited to SAR, since it deals only with the range direction. It could also be exploited for coherent radars. or coherent radars.

APPENDIX A

Scene Cross-Correlation in SAR Interferometry

Let us derive equations 22, 23 and 24. Exploiting the approximate expression of the two received signals 17 and 18, the following relation holds:

$$E[s_{12}(\tau)] = E[s_1(\tau) \cdot s_2^*(\tau)] = \qquad (42)$$

$$\exp\left(j\frac{2\omega_o}{c}\left(z_{o2} - z_{o1} + \frac{\tau(\sin\theta_2 - \sin\theta_1)}{\gamma}\right)\right) \cdot$$

$$E\left[\int_{-\infty}^{\infty} r\left(\frac{\tau - \eta}{\gamma} - y_o\right) \cdot \right.$$

$$\exp\left(j\frac{2\omega_o\eta}{c}\frac{\sin\theta_1}{\gamma}\right)\omega(\eta)d\eta \cdot \int_{-\infty}^{\infty} r^*\left(\frac{\tau - \xi}{\gamma} - y_o\right) \cdot$$

$$\left. \exp\left(-j\frac{2\omega_o\xi}{c}\frac{\sin\theta_2}{\gamma}\right)\omega^*(\xi)d\xi \right]$$

Since we have supposed a white Gaussian reflectivity distribution with power $\sigma^2_o$ and a real window $\omega$, we get the following simplification:

$$E[s_{12}(\tau)] = \exp\left(j\frac{2\omega_o}{c}\left(z_{o2} - z_{o1} + \frac{\tau(\sin\theta_2 - \sin\theta_1)}{\gamma}\right)\right) \cdot \qquad (43)$$

$$\int_{-\infty}^{\infty} \frac{\sigma_o^2}{\gamma} \exp\left(j\frac{2\omega_o\eta}{c}\frac{\sin\theta_1 - \sin\theta_2}{\gamma}\right)\omega^2(\eta)d\eta$$

Finally, exploiting equations 15, 16 and 21, the following expression holds:

$$E[s_{12}(\tau)] = \exp\left(j\frac{2\omega_o}{c}(z_{o2} - z_{o1})\right) \cdot \qquad (44)$$

$$\exp(j\Omega\tau) \cdot \frac{\sigma_o^2}{\gamma} \int_{-\infty}^{\infty} e^{-j\Omega\eta}\omega^2(\eta)d\eta$$

APPENDIX B

Multiple Surveys Combination

Let us derive equation 29.

$$S_3(\tau) = S_1(\tau) + e^{j\phi}S_2(96) \qquad (45)$$

Exploiting equation 43:

$$s_3(\tau) = s_1(\tau) + e^{j\frac{2\omega_o}{c}(z_{o2}-z_{o1})} \qquad (46)$$

$$\exp\left(j\frac{2\omega_o\tau}{c}\frac{\sin\theta_2 - \sin\theta_1}{\gamma}\right)s_2(\tau)$$

Substituting expressions 17 and 18 in equation 46, we obtain:

$$s_3(\tau) = r(\tau/\gamma + y_o) e^{-j\frac{2\omega_o}{c}(z_{o1} + \frac{r\sin\theta_1}{\gamma})} * \omega(\tau) + \qquad (47)$$

$$+ e^{j\frac{2\omega_o}{c}(z_{o2}-z_{o1})} \cdot e^{j\frac{2\omega_o\tau}{c}\frac{\sin\theta_2-\sin\theta_1}{\gamma}} \cdot$$

$$(r(\tau/\gamma + y_o)e^{-j\frac{2\omega_o}{c}(z_{o2} + \frac{r\sin\theta_2}{\tau})} * \omega(\tau))$$

Equation 47 can be simplified as follows:

$$s_3(\tau) = e^{-j\frac{2\omega_o}{c}z_{o1}} \cdot [r(\tau/\gamma + y_o) e^{-j\frac{2\omega_o\tau}{c}\frac{\sin\theta_1}{\gamma}} * \omega(\tau) + \qquad (48)$$

$$+ e^{j\frac{2\omega_o\tau}{c}\frac{\sin\theta_2-\sin\theta_1}{\gamma}}(r(\tau/\gamma + y_o) e^{-j\frac{2\omega_o\tau}{c}\frac{\sin\theta_2}{\gamma}} * \omega(\tau))]$$

Equation 48 can be written in the different form:

$$s_3(\tau) = e^{-j\frac{2\omega_o}{c}z_{o1}} \cdot [r(\tau/\gamma + y_o) e^{-j\frac{2\omega_o\tau}{c}\frac{\sin\theta_1}{\gamma}} * \omega(\tau) + \qquad (49)$$

$$+ r(\tau/\gamma + y_o)e^{-j\frac{2\omega_o\tau}{c}\frac{\sin\theta_1}{\gamma}} * \omega(\tau) e^{j\frac{2\omega_o\tau}{c}\frac{\sin\theta_2-\sin\theta_1}{\gamma}}]$$

Thus, the following expression holds:

$$s_3(\tau) = e^{-j\frac{2\omega_o}{c}z_{o1}} r(\tau/\gamma + y_o)e^{-j\frac{2\omega_o\tau}{c}\frac{\sin\theta_1}{\gamma}} * \qquad (50)$$

$$(\omega(\tau) + \omega(\tau)e^{j\frac{2\omega_o\tau}{c}\frac{\sin\theta_2-\sin\theta_1}{\gamma}})$$

Finally, exploiting equations, 15, 16, 17 and 21, we get:

$$S_3(\tau) = S_1(\tau) \times (\omega(\tau) + \omega(\tau)e^{j\Omega\tau}) \qquad (51)$$

APPENDIX C

SAR Interferometry With Altitude Variation

If we have altitude variations:

$$E[s_{12}(\tau)] = E[s_1(\tau) \cdot s_2^*(r)] = \exp\left(j\frac{2\omega_o}{c}\left(z_{o2} - z_{o1} + \frac{\tau(\sin\theta_2 - \sin\theta_1)}{\gamma}\right)\right) \cdot \qquad (52)$$

$$\int_{-\infty}^{\infty} \frac{\sigma_o^2}{\gamma} e^{j\frac{2\omega_o\eta}{c}\frac{\sin\theta_1-\sin\theta_2}{\gamma}} E[e^{-j\frac{2\omega_o}{c}q(y_o + \frac{r-\eta}{\gamma})(\cos\theta_1-\cos\theta_2)}]\omega^2(\eta)d\eta$$

Then, assuming $q(y_o + u)$ smaller than a few meters, equation 52 can be approximated as follows:

$$E[s_{12}(\tau)] = \exp\left(j\frac{2\omega_o}{c}\left(z_{o2} - z_{o1} + \frac{\tau(\sin\theta_2 - \sin\theta_1)}{\gamma}\right)\right) \cdot \qquad (53)$$

-continued $$\frac{\sigma_o^2}{\gamma} \int_{-\infty}^{\infty} e^{j\frac{2\omega_0\eta}{c} \frac{\sin\theta_1 - \sin\theta_2}{\gamma}} \left(1 - j\frac{2\omega_o}{c}(\cos\theta_1 - \cos\theta_2)E\left[q\left(y_o + \frac{\tau - \eta}{\gamma}\right)\right]\right)\omega^2(\eta)d\eta$$

Finally, the following expression holds:

$$E[s_{12}(\tau)] = \exp\left(j\frac{2\omega_o}{c}(z_{o2} - z_{o1})\right) \cdot \exp(j\Omega\tau) \cdot \tag{54}$$

$$\left(1 + j\frac{2\omega_o}{c}(\Delta\theta \cdot \dot{q}_{av}(y_o + \tau/\gamma) \cdot \sin\theta)\right) \cdot$$

$$\frac{\sigma_o^2}{\gamma}\int_{-\infty}^{\infty} e^{-j\Omega\eta}\omega^2(\eta)d\eta$$

where $q_{au}(y_o+u)$ is the average altitude within the resolution cell.

What is claimed is:

1. A process for generating synthetic aperture radar interferograms comprising the steps of:
    generating a first and a second radar image of a scene from a first and a second position spaced apart by a given baseline,
    recording a first signal of said first image within a first radio frequency band of the spectrum,
    recording a second signal of said second image within a second radio frequency band of the spectrum having a frequency shift relatively to said first detecting band, said frequency shift being such that it ensures or maximizes correlation between the first and the second images,
    combining said first and second signals for generating an interferogram of said scene.

2. A process as in claim 1 wherein said first and second radar images are generated on two separate passes by a first and a second satellite on two separate orbits and wherein at least one of said satellites has tunable reception means whereby said frequency shift may be produced.

3. A process as in claim 1 or 2 wherein the step of recording a second signal includes said frequency shift as:

$$\Omega = \left[\frac{\omega_0 \Delta\theta}{\tan\theta}\right]$$

$\omega_0 = 2\pi f_o$, $f_o$ being the central frequency of an image generator,
$\theta$ = mean value of the off-nadir angles of the first and second positions,
$\Delta\theta$ = difference between the off-nadir angles of the first and second positions.

4. A process as in claim 1 or 2 wherein the step of combining said first and second signals also comprises a step of shifting a phase of the second signal relatively to the first signal.

5. A process as in claim 4 wherein said shifting a phase is by a constant term which maximizes the absolute value of this image.

6. A process as in claim 4 wherein the shifting a phase is for each point $y_o$ of the scene, $$\phi = \frac{2\omega_o}{c}(z_{o2} - z_{o1}) + \Omega\tau$$

c = speed of light
$z_{o1}, z_{o2}$ = distance between respectively said first and second positions and a given point $y_O$ on the ground surface.

$$\tau = \frac{2u}{c}\sin\theta$$

$u = y - y_o$
$y$ = ground range variable
$y_o$ = abscissa of said given point.

* * * * *

UNITED STATES PATENT AND TRADEMARK OFFICE
CERTIFICATE OF CORRECTION

PATENT NO. : 5,332,999
DATED : July 26, 1994
INVENTOR(S) : Claudio PRATI and Fabio ROCCA It is certified that error appears in the above-indentified patent and that said Letters Patent is hereby corrected as shown below:

Column 4, line 27, change "h$^2$", (second occurrence), to --y$^2$--;

Column 4, line 48, change "Z01" to --$Z_{01}$--; and change "x" (second occurrence) to --*--.

Column 5, line 5, change "Z02" to --$Z_{02}$--;

Column 5, line 46, change "Z01" to --$Z_{01}$--;

Column 5, line 47, change "x" (second occurrenc) to --*--;

Column 5, line 49, change "x" (second occurrence) to --*--;

Column 5, line 57, change "Z01" to --$Z_{01}$--;

Column 5, line 59, change "Z02" to --$Z_{02}$--.

Column 6, line 20, change "x" to --*--;

Column 6, line 23, change "x" to --*--.

UNITED STATES PATENT AND TRADEMARK OFFICE
CERTIFICATE OF CORRECTION

PATENT NO. : 5,332,999
DATED : July 26, 1994
INVENTOR(S) : Claudio PRATI and Fabio ROCCA It is certified that error appears in the above-indentified patent and that said Letters Patent is hereby corrected as shown below:

Column 7, line 23, change "·" to --*--.

Column 8, line 67, change "w(2/x)" to --*w(2/cx)--.

Column 9, line 8, change "Z01" to --$Z_{02}$--;

Column 9, line 36, change "Z01" to --$Z_{01}$--;

Column 9, lines 53 and 54, change "Z01" to --$Z_{01}$--;

Column 9, lines 56 and 57, change "Z02" to --$Z_{01}$--.

Column 11, line 26, change "σ²o" to --$\sigma\sigma^2$--.

Column 12, line 45, change "x" to --*--.

Signed and Sealed this

Seventeenth Day of January, 1995

BRUCE LEHMAN

*Attest:*

*Attesting Officer*   Commissioner of Patents and Trademarks